INVENTOR.
ALMY D. COGGESHALL
BY
HIS ATTORNEY

United States Patent Office 2,844,746
Patented July 22, 1958

2,844,746

SUPPORT MEANS FOR ROTOR END WINDINGS OF DYNAMOELECTRIC MACHINES

Almy D. Coggeshall, Schenectady, N. Y., assignor to General Electric Company, a corporation of New York Application February 17, 1956, Serial No. 566,128

4 Claims. (Cl. 310—65)

This invention relates to dynamoelectric machines, particularly to an improved support means for preventing axial shifting of the rotor end windings of a dynamoelectric machine.

The rotor end windings of a dynamoelectric machine are subjected to axial forces resulting from differential thermal expansion of the windings relative to the rotor core. These forces tend to move the coil ends axially out of their original radial alignment. In addition, the coil ends are also urged out of alignment by the angular acceleration forces developed during short circuits of the generator. This axial movement, if permitted, could result in the buckling of the rows of end turns and the breaking of the coil connections located at the collector end of the generator.

This tendency for the coil ends to move axially out of position must be resisted by support means provided between the axially spaced rows of conductor coil ends. The support means must be strong enough to withstand the crushing forces caused by the differential thermal expansion and the angular acceleration forces developed during short circuits on the generator.

It has been common practice to use blocks of wood or "slugs" of asbestos cloth-phenolic resin laminate between the axially adjacent end turns. These blocks are first machined to approximate size from sheet stock and then individually fitted to the appropriate spot between the coils. This hand fitting is necessitated by the somewhat random coil spacing which results from the difficulty of placing one turn exactly on top of another. Proper fitting is also made more difficult by the irregular surfaces of the coils themselves. In addition, when separate blocks are used, their tendency to shift sideways must be resisted by mortising a band of material into adjacent blocks to connect them together.

Blocks used in this fashion are costly to machine to exact size, and assembly in the generator involves a substantial amount of time and labor.

Accordingly, an object of this invention is to provide a support means for maintaining the end turns of the conductors of a dynamoelectric machine in radial and axial alignment which overcomes the hand-fitting required with separate support blocks, and which supports substantially all of the end turn coil surface requiring support while at the same time permitting the end turns to be ventilated.

Other objects and advantages will become apparent from the following description taken in connection with the accompanying drawings, in which.

Generally stated, the invention is practiced by providing corrugated spacer members between the adjacent rows of axially spaced end windings. These spacers are designed to support the end turns as a column to prevent them from getting out of radial alignment due to the large axial forces imposed thereon.

Figure 3:
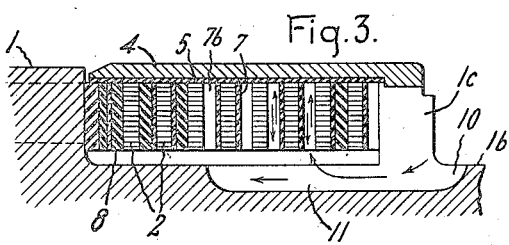
Fig. 3 is a sectional view taken along line 3—3 of Fig. 1 with the addition of a conventional retaining ring.

Referring now more particularly to the drawings, the invention is shown as applied to a generator rotor, indicated generally at 1, having a cylindrical body portion 1a and a reduced diameter rotor shaft end portion 1b. The electrical winding comprises a plurality of conductor bar structures 2 disposed in slots 3 in the rotor body and having end portions 2a extending circumferentially through an arc around the reduced diameter end portion 1b of the rotor. These winding end portions 2a are supported against the action of centrifugal force by the high strength retaining ring 4 (Fig. 3). An insulating tube 5 (Fig. 3) separates the windings from the retaining ring 4, if the latter is fabricated of a conductive material.

The end portions 2a are also subjected to forces tending to move them axially as the generator comes up to normal operating conditions. These forces include those resulting from a differential thermal expansion existing between the conductors and the rotor and those developed during short circuits on the generator. Wedge shaped blocks 6 are provided between the coil sides where they emerge from the rotor body to prevent the coil ends from shifting peripherally under their own acceleration when the machine is subject to short circuits. The axial forces tend to move the coils out of alignment, and when such misalignment occurs the centrifugal forces acting on the radial "column" of coil turns would tend to tip them over, which must be prevented. This is accomplished by providing a special support member in the form of a corrugated member 7 between the respective adjacent rows of end turns 2a. The members 7 absorb, by a limited degree of flexing, some of the axial forces imposed thereon, and transmit the remainder from support member to support member to the rotor body 1a through the "centering ring" flange portion 1c of the rotor 1.

Figure 2:
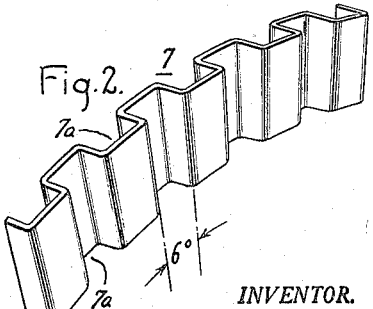
Fig. 2 is a perspective view of the corrugated members shown in Fig. 1.

The spacer members 7 define corrugations which extend substantially radially and in the embodiment shown (see Fig. 2) are located at 6° intervals. The members 7 are cut to such an arcuate length that when installed they extend along substantially all of the circumferentially extending portions 2a of the end turns 2.

Figure 4:
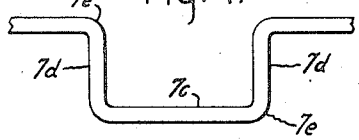
Fig. 4 is a detail view of one of the corrugations.

The corrugations 7a have a cross-section the shape of a block-U (Fig. 4), consisting of a straight circumferentially extending bottom portion 7c and straight axially extending "leg" portions 7d, which are disposed normal to the bottom portion 7c, being connected by small-radius corner portions 7e. With this configuration, the corrugations provide a structure which is capable of taking the great axial loads acting thereon in compression, and support the radially extending rows of conductors 2 at regular intervals along the circumferentially extending end turn portions 2a. The straight side portions 7d of the U are, in effect, "columns" loaded in compression by the axial forces created by thermal expansion of the slot portions of the conductors 2.

Due to the difficulty in making the end turns fall exactly into radial alignment, with the possibility that the radial columns of coils will have some slightly protruding turns, the spacer members 7 are made slightly narrower (in a direction axial of the rotor) than the "nominal" axial spacing between coils. When constructed in this manner and inserted, they engage only the axially protruding end turns. This design permits assembly without precise fitting (since the protruding turn portions may be deflected slightly as the spacer is driven into place), while still yielding a tight structure. The resulting contact areas between the member 7 and the protruding turns 2a have been found sufficient to maintain them in place against the centrifugal forces acting on the spacer 7. Since this construction results in small axial clearances between the spacer and those turns other than the ones that "protrude," those other turns can expand freely, to some extent, without setting up forces on the spacers.

An additional feature of this construction is that, where it is found necessary to reinforce the support members at points of high stress concentrations, this can easily be accomplished by inserting solid hand-fitted blocks 8, of wood or plastic laminate material. These blocks 8 serve the additional important function of limiting the degree to which the expansion of the conductors can compress the spacers by causing the axially extending "legs" 7d of the corrugations 7a to flex slightly.

A major advantage of this corrugated spacer lies in the fact that, while providing adequate support for the coil end turns 2a, it also provides means for cooling the end turns by coolant fluid flowing up through the radial passages 7b formed by the corrugations. This cooling arrangement can best be seen by referring to Fig. 3, which shows the flow path of the cooling gas. The coolant flows into axial sub-slot 10, through chamber 11 formed beneath the end windings 2, and into passages 7b to cool the end winding portions 2a.

The spacers 7 can be made from any insulating material of suitable strength, such as phenolic, melamine, epoxy or polyester organic resins, and preferably are reinforced by such materials as glass or asbestos fiber, or paper.

Figure 1:
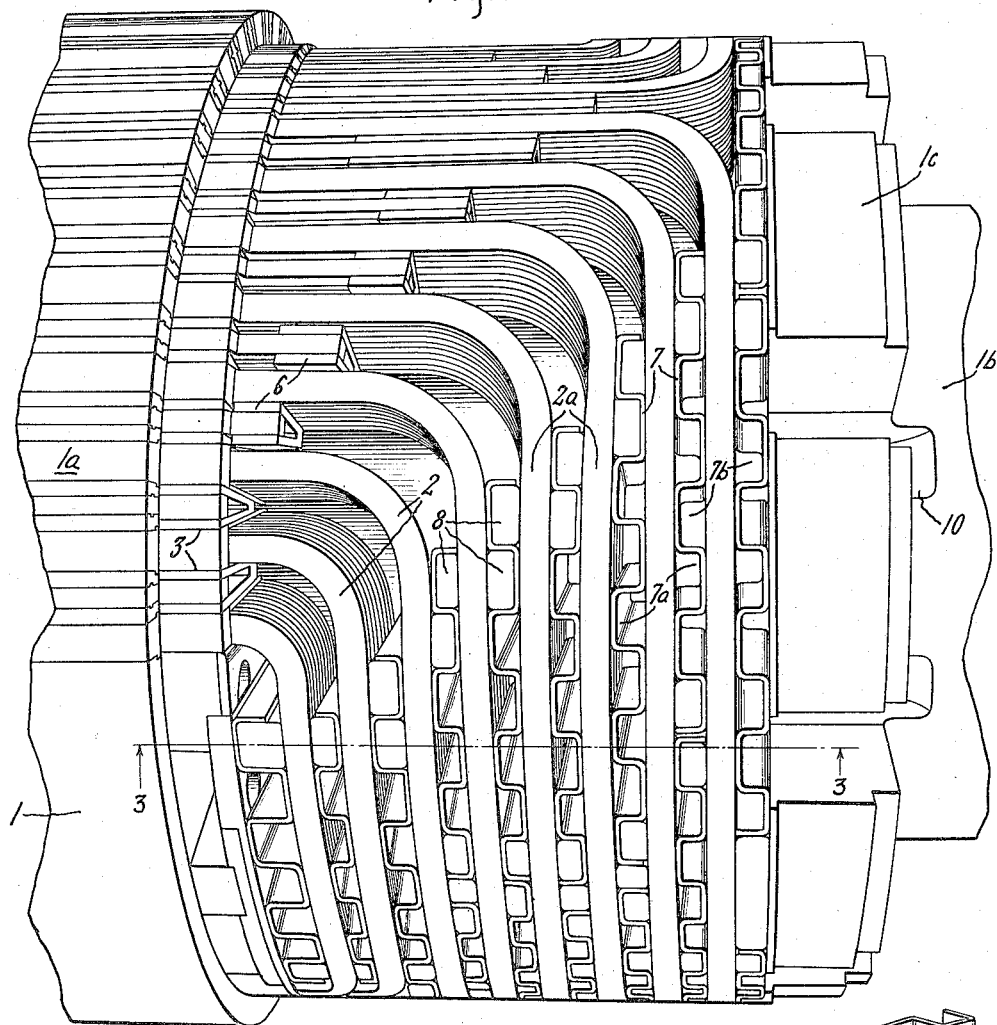
Fig. 1 is a perspective view of the end turns of a generator rotor incorporating the invention.

The method of assembly of this improved spacer is as follows. The spacers 7 are located in place by temporarily springing the end turns 2a apart by inserting oversized wooden blocks (not shown). The spacers 7 are then cut to proper length and inserted as shown in Fig. 1. The oversized blocks are then removed. If reinforcement is necessary, the solid blocks 8 are then carefully fitted and driven into place wherever necessary, being careful that the number of adjacent blocks 8 does not reduce the cooling effect below a safe minimum.

It will be seen that the end turns 2 are prevented from moving axially as a result of axial forces imposed thereon, by providing somewhat flexible "undulated" spacer members between the rows of end turns, having corrugations in the shape of a block-U which provides passages for coolant past the end turns, while having substantial strength to withstand axial compressive forces.

It will be obvious to those skilled in the art that changes and substitutions of equivalents might be made without detracting from the invention. For example, the corrugations 7a might have a polygonal cross-section other than rectangular.

It is, of course, desired to cover by the appended claims all such modifications as fall within the true spirit and scope of the invention.

What I claim as new and desire to secure by Letters Patent of the United States is:

1. A dynamoelectric machine rotor having conductors disposed in axial slots in the rotor body and which conductors define a plurality of axial spaced radially extending rows of circumferentially entending conductor end portions, support means disposed between said rows of conductor end portions for maintaining the radial and axial alignment of said rows, said support means consisting of corrugated members in which the corrugations extend substantially radially and define a polygonal cross-section in a plane normal to the radius of the rotor, whereby said rows are supported against axial displacement by a series of spaced columns along a substantial part of said circumferentially extending conductor end portions.

2. A rotor for a dynamoelectric machine having a winding arrangement comprising conductors which are disposed in axial slots in the rotor body and which define a plurality of axially spaced rows of conductor end portions, and support means disposed between said rows of conductor end portions comprising corrugated members, each corrugation extending substantially radially and having a cross-section in a plane normal to a radius of the rotor substantially of a U-shape with the side-walls of the U being substantially straight and connected to the bottom of the U by a portion of small radius whereby compression loads applied to the spacer member result in the straight side-walls of the U being stressed as columns in compression.

3. Support means in accordance with claim 2 in which the corrugated spacer members are arc-shaped and the corrugations are slightly narrower in a direction axial of the rotor than the nominal spacing between the rows of conductor end turns, whereby the support means will be held in place by engagement with the protruding end turns while the others may freely move axially in response to differential thermal expansion of the slot portions of the conductors, whereby said other conductor end turns impose little or no compression forces on the spacers.

4. A dynamoelectric machine rotor having conductors disposed in axial slots in the rotor body with a plurality of axially spaced rows of conductor end portions extending circumferentially through an arc around a reduced diameter end portion of the rotor, means for maintaining said rows axially spaced and radially aligned, said means comprising arc-shaped corrugated spacer members extending over substantially the entire arcuate length of said circumferential extending conductor end portions, each corrugation being substantially the shape of a block U in cross section and having a width in a direction axial of the rotor slightly less than the nominal axial spacing between said rows, and solid spacer block members located in and substantially filling certain of said corrugation for providing local reinforcement and establishing a limit to the degree the corrugated spacer member may be compressed by axial forces imposed by differential thermal expansion of the conductors.

References Cited in the file of this patent

UNITED STATES PATENTS

| | | |
|---|---|---|
| 790,471 | Wright | May 23, 1905 |
| 831,625 | McElroy | Sept. 25, 1906 |
| 1,793,434 | Blathy | Feb. 17, 1931 |
| 1,819,860 | Befils | Aug. 18, 1931 |
| 2,791,707 | Willyoung | May 7, 1957 |

FOREIGN PATENTS

| | | |
|---|---|---|
| 104,307 | Austria | Oct. 11, 1926 |
| 666,851 | France | May 28, 1929 |
| 742,199 | Great Britain | Dec. 21, 1955 |

UNITED STATES PATENT OFFICE
CERTIFICATE OF CORRECTION

July 22, 1958

Patent No. 2,844,746     Almy D. Coggeshall

It is hereby certified that error appears in the printed specification of the above numbered patent requiring correction and that the said Letters Patent should read as corrected below.

Column 3, line 63, for "axial" read -- axially --; line 64, for "entending" read -- extending --; column 4, line 48, for "corrugation" read -- corrugations --.

Signed and sealed this 23rd day of September 1958.

(SEAL)
Attest:

KARL H. AXLINE
Attesting Officer

ROBERT C. WATSON
Commissioner of Patent